United States Patent [19]

Obdrzalek

[11] 3,807,207

[45] Apr. 30, 1974

[54] METHOD AND APPARATUS FOR EFFECTING A CONTROLLED REDUCTION IN THE CROSS-SECTION OF A TUBULAR ELECTRIC HEATER

[76] Inventor: Stanislaus Obdrzalek, 73 Etrichstrasse, Salzburg, Austria

[22] Filed: July 11, 1972

[21] Appl. No.: 270,822

[30] Foreign Application Priority Data
July 13, 1971  Austria ............................ 36088/71

[52] U.S. Cl. ............................. 72/12, 72/14, 72/234
[51] Int. Cl. ............................................ B21b 37/00
[58] Field of Search ................... 72/10, 11, 12, 8, 9

[56] References Cited
UNITED STATES PATENTS
3,000,243  9/1961  Stringer .................................. 72/9
2,332,797  10/1943  Hume ............................. 72/199 X

*Primary Examiner*—Milton S. Mehr
*Attorney, Agent, or Firm*—Fleit, Gipple & Jacobson

[57] ABSTRACT

The invention provides a method and apparatus for use in the manufacture of tubular electric heaters, wherein a heater element is embedded in a tube in a powdered insulating material, and the cross-section of the tube is thereafter reduced and the insulating material is compressed by hammering around the tube, rolling, or the like, thereby causing an increase in length of the tube. To ensure a final desired nominal length of tube, the length of the tube is sensed during the rolling or hammering operation, at a stage in production when the length of the tube lies below or at the desired nominal length. Any further reduction in cross-section of the tube is controlled in accordance with the length so sensed and in a stepless variable manner so that the tube is of the desired nominal length when the hammering or rolling step is concluded.

13 Claims, 1 Drawing Figure

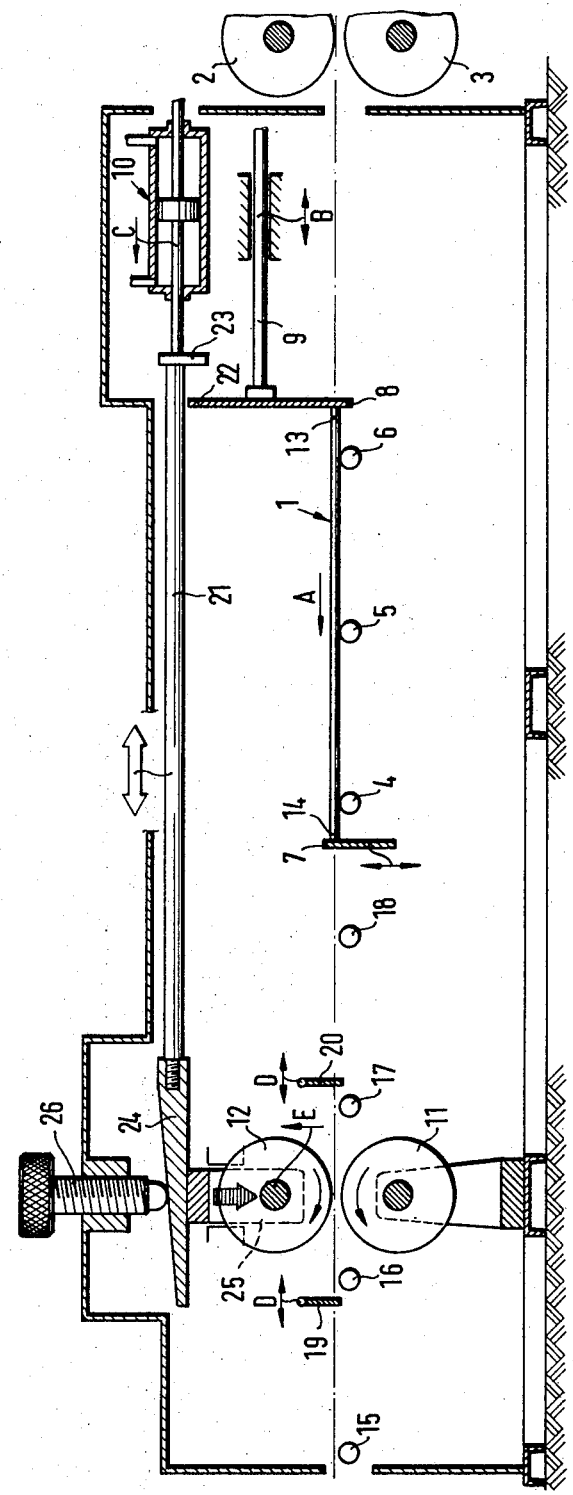

METHOD AND APPARATUS FOR EFFECTING A CONTROLLED REDUCTION IN THE CROSS-SECTION OF A TUBULAR ELECTRIC HEATER

The invention relates to tubular electric heaters, of the kind in which a heater element is embedded in a powdered insulating material inside a tube.

In the manufacture of such tubular electric heaters, after the element and powdered insulating material are inserted into the tube, the cross-section of the tube is reduced and the insulating material compressed by hammering round the tube, rolling it or the like.

The preferred insulating material is magnesium oxide, and the open ends of the tube are closed by sealing elements such as insulation beads. The operation of reducing the cross-section improves heat conductance from the coil to the surface of the tube and improves the electrical insulation properties of the insulating material.

However, some elongation of the tube is inevitable when the tube is reduced in cross-section. The tolerances in the tubes and in the machines producing them results in variations in the amount of elongation, so that when the cross-section of the heaters has been reduced the lengths thereof vary. Yet an accurate length of heater is necessary for further processing and the heaters, i.e. both the tubes and connecting pins of the elements projecting therefrom, therefore have to be trimmed after the cross-section has been reduced.

A serious drawback inherent in trimming the tubes is in the increased consumption of material, both in respect of the tube material and in respect of the connecting pins and the magnesium oxide. There may be as much as about 10 percent wastage, depending on the total length of the rods.

If the heater is trimmed, the magnesium oxide or other insulating material extending to the end of the tube has to be removed in sufficient quantities to enable sealing material to be inserted in the ends of the tube and the neck of an insulation bead to be inserted, in order to produce a perfect seal. However, when the insulating material is cleaned out, traces of it will often be left clinging to the tube or to the pin. As a result of this adhering residual material it is not possible to obtain an absolutely perfect seal at the ends of the tube, since the insulating material is in most cases hygroscopic and moisture can therefore pass through the layer of such material which is left behind.

A further disadvantage of trimming is experienced in cases where the connecting pin has to be provided with a screw-thread. When the cross-section of the tube is reduced, the diameter of the pin is in fact reduced simultaneously, i.e. the part of the pin which is then inside the insulating material is smaller in diameter than the part which was then outside it. Thus, when the heaters are trimmed, it frequently happens that the projecting pin will be partly small and partly large in diameter, which is a disadvantage when a screw-thread has to be formed on it.

In order to reduce the great differences in length it has been proposed to introduce an automatic length measuring process, following the reduction in the cross-section of the heater, and to give a small amount of additional treatment to heaters which have not attained the necessary length during the first reduction in cross-section. This after-treatment is not infrequently repeated two or three times. Although it is possible in this way to divide the large length tolerances into several groups of smaller tolerances, it is necessary to use complex apparatus; and it is still not possible to obtain accurate lengths. Finally, because of the complex machinery required, this last mentioned method can be used only for very large scale production, where all the machinery can remain set to a given nominal length for a long period.

Another previously proposed method of obtaining tubular heaters of equal length without trimming is to plan the length of the filled tube before the reduction in cross-section, in such a way that after such reduction the upper limit of the length tolerance is less than or equal to the desired length, and to extend the tubular heater to the nominal size following the reduction in cross-section. Yet this relatively simple process has the drawback that cracks form within the compressed magnesium oxide, which impair a burning through effect. Furthermore, if an extended tubular heater is bent and then re-compressed by subjecting it to an isostatic compression process in accordance with U.S. Pat. No. 3478423, then the cracks which formed in the magnesium oxide through the extending action are eliminated, but at the same time the tube reverts to the length which it had before being extended.

According to the invention there is provided a method of effecting a controlled reduction in the cross-section of tubular electrical heaters each formed by a heater element embedded in powdered insulating material within a tube, comprising the steps of sensing the length of tube at a stage of production of the heater when the length of the heater is less than or equal to a desired nominal length, and controlling, in accordance with the length so sensed and in a stepless variable manner, apparatus to reduce the cross-section of the tube, so that upon operation of said apparatus a desired length of tube is obtained.

The method advantageously includes engaging a front end of the tube with a first measuring sensor and thereafter moving a second measuring sensor up to the rear end of the tube, in a manner such that the second measuring sensor is brought to a standstill when it comes into contact with the rear end of the tube and thereby sets the desired amount by which the cross-section is to be further reduced.

An advantageous way of achieving this effect is for movement of the second measuring sensor towards the front end of the tube to bring about an increase in the forces reducing the cross-section.

In order to simplify the measuring process the tube is brought to a standstill when its front end reaches the first measuring sensor and operates an electric contact whereby the second measuring sensor is brought up to the rear end of the tube. The action of the apparatus reducing the cross-section is preferably reinforced hydraulically and/or electrically and/or mechanically.

It is particularly advantageous if the reduction in cross-section which is carried out to correct the length of the tube is initiated at a position spaced along the tube from the front end of the tube and is terminated at a position spaced along the tube from the rear end of the tube, the distances between said positions and the respective ends of the tube substantially corresponding to the length of sealing elements which have to be inserted in the ends in the tube. In this way the portions of tube adjoining the two ends remain at their original diameter. This facilitates insertion in holding means such as nipples or the like. Moreover sealing elements of predetermined length and cross-section can be used to seal the ends in the tube.

According to the invention furthermore apparatus for effecting a controlled reduction in the cross-section of tubular electric heaters formed by a heater element embedded in a powdered insulating material within a tube, comprising conveying means for the tube; apparatus to act upon the tube to reduce the cross-section thereof; a first measuring sensor movable transversely to the direction in which the tube is moved by the conveying means; and a second measuring sensor movable in the same direction as the direction in which the tube is moved by the conveying means; said apparatus to act upon the tube to reduce the cross-section of the tube being provided downstream of a measuring section extending between said first and said second sensors in the direction in which the tube is conveyed, and said apparatus being coupled to said second sensor in such a way that the extent of its reducing action is set when the front end of the tube is in contact with said first sensor and the rear end of the tube is in contact with said second sensor.

Preferably the first measuring sensor is in the form of a stationary stop and the second measuring sensor in the form of a stop arranged on a slide. Said apparatus is preferably provided downstream of the measuring section, extending between the sensors and is in the form of one or more pairs of rollers. The spacing of the pair or pairs of rollers decreases with the movement of the slide towards the rear end of the tube in the direction in which the tube is conveyed.

The slide is coupled to the pair or pairs of rollers by servo means, advantageously a mechanical lever mechanism, an electrical control mechanism or a hydraulic system.

In order to ensure that portions of the tubular heater adjoining the two ends of the tube are left at their original diameter, the setting of the pair or pairs of rollers to the spacing found desirable is delayed until the front end of the tube has been conveyed a determined distance through the pair or pairs of rollers and the rollers are lifted off the tube when the tube has been guided through them up to a determined distance away from its rear end.

The invention is diagrammatically illustrated by way of example in the accompanying drawing, which shows stages in a method according to the invention and part of apparatus for carrying out the method.

A tubular heater 1, which has to be rolled to a desired length is moved through a rolling machine in the direction of arrow A. It has left two rollers 2 and 3 of a rolling mill which has produced a given reduction in the cross-section of the tubular heater. The tubular heater 1 lies on conveying rolls 4, 5, 6, its length being less than or equal to the desired nominal length. The tubular heater 1 lies in a measuring section of a rolling machine between two measuring sensors 7 and 8.

The measuring sensor 7 is constructed as a stop in the rolling machine. It is stationary with respect to the axial direction in which the heater 1 moves but displaceable perpendicularly to that direction. The measuring sensor 8 is also formed as a stop and is provided on a measuring slide 9 which is displaceable in the directions of double arrow B. The stop 8 is coupled to the transmission rod 21, in a manner described hereinafter, and the transmission rod 21 carries a wedge 24. The function of a pair of rollers 11 and 12 is further to reduce the cross-section of the tubular heater 1. These rollers may be initially set by means of a screw spindle 26.

The extent of the further reduction in cross-section is controlled by the movement of the measuring slide 9. The tubular heater 1 moves out from between the rollers 2 and 3, driven by the conveying rolls 4, 5 and 6, and towards the stop 7, coming to a standstill as soon as its front end 14 abuts the stop 7. The abutment of the heater 1 and stop 7 causes the stop 8, which is displaceable in an axial direction with the slide 9, to be moved towards the rear end 13 of the tube. The distance covered in this movement is transmitted by the transmission rod 21 to the wedge 24 and thus to the pair of rollers 11, 12 (which are displaceable relative to one another) in such a way as to lessen the distance between the rollers. This means that, the further the length of the tubular heater is below the desired length, the smaller will be the set distance between the two rollers 11, 12. The smaller this spacing, the smaller will be the diameter of the heater 1 after passing through the rollers 11, 12. But the smaller its diameter becomes, the more the heater 1 will be elongated in the rolling process, so in this way length tolerances can be adjusted. Thus, it is possible, by adjusting the spacing of the pairs of rollers 11, 12 downstream of the measuring section between the two stops 7 and 8, consistently to produce tubular heaters of a desired length. The spacing between the rollers 11, 12 can be adjusted by having the front end 14 of the heater 1 lying against the measuring stop 7 and the measuring stop 8 on the movable slide 9 lying against the rear end 13. The further the slide 9 is displaced to the left as viewed in the drawing, i.e. in the direction of movement of the heater 1, the smaller will the spacing between the rollers 11, 12 as set by the adjusting means 21, 24. In this way the action of the rollers 11, 12 on the heater is set so that the tube takes on the desired length as a result of the reduction made in its cross-section.

The stop 8 is coupled to the transmission rod 21 by an additional stop 22 which is fixed to the stop 8 on the slide 9 and which moves with the stop 8 towards the rear end 13 of the tube. As soon as the stop 8 abuts the rear end 13, the slide 9 comes to a standstill and the stop 7 is lowered by means of a contact (not shown), so that the heater 1 is moved towards the pair of rollers 11, 12 by the conveying rolls 4, 5, 6 and by further conveying rolls 17 and 18. At this stage the gap between the rollers 11, 12 is still open. As soon as the front end 14 of the heater 1 reaches an abutment contact 19, the latter is closed and the righthand end of a pressure cylinder 10 is pressurized to cause the rod 21 to move in the direction of the arrow C until a stop 23 on the rod 21 is thus inserted by a determined amount between the setting spindle 26 and a bearing block 25 of the roller 12. The shorter the tubular heater 1, the greater is the distance moved by the rod 21 in the direction of arrow C and the greater the closing action of the wedge 24. As the abutment contact 19 is located downstream of the pair of rollers 11, 12, the rollers are closed only when the front end of the heater has already passed through them. The contact 19 can be moved in the directions indicated by double arrow D in order to control the length of the part of the heater which is not to be reduced. In this way the length of the part at the front end of the heater which is not to be reduced can be set. As soon as the rear end of the tubular heater passes beyond a further abutment contact 20, the left-hand end of the pressure cylinder 10 is pressurised and thereby draws back the wedge 24 connected to the rod 21, to permit movement of the bearing block 25 of the roller 12 in the direction of arrow E. The stop 20 can also be moved axially in the directions indicated by the double arrow D. The angle of the wedge 24 is chosen so as to produce desired elongations of the heater 1 for determined movements of the wedge 24.

After passing through the rollers 11 and 12 the heater, now having the desired length, is conveyed away by conveying rolls 15 and 16.

The diagrammatic sketch obviously illustrates only one of the many possible embodiments of apparatus according to the invention. Thus, for example, an electric motor drive may be provided instead of the pressure cylinder 10 or an electrical or a hydraulic transmission may be substituted for the transmission rod 21.

With this machine it is naturally also possible to reduce the cross-section of the whole length of heater in the rollers 11, 12, if so desired. This can be done by appropriately moving the abutment contacts 19, 20 towards the rollers 11, 12 or by transmitting the movement of the stop 8 directly to the connecting rod 21.

What is claimed is:

1. A method of effecting a controlled reduction in the cross-section of tubular electrical heaters, each formed by a heater element embedded in powdered insulating material within a tube, comprising the steps of sensing the length of tube at a stage of production of the heater when the length of the heater is less than or equal to a desired nominal length, controlling, in accordance with the length so sensed and in a stepless variable manner, apparatus to reduce the cross-section of the tube, so that upon operation of said apparatus a desired length of tube is obtained, and engaging a front end of the tube with a first measuring sensor and thereafter moving a second measuring sensor up to the rear end of the tube, in a manner such that said second measuring sensor is brought to a standstill when it comes into contact with the rear end of the tube and thereby sets the desired amount by which the cross-section is to be further reduced.

2. A method as claimed in claim 1, wherein movement of said second measuring sensor in a direction towards the front end of the tube brings about an increase in the forces reducing the cross-section.

3. A method as claimed in claim 1, wherein the tube is brought to a standstill when its front end reaches said first measuring sensor and operates a contact whereby said second measuring sensor is brought to the rear end of the tube.

4. A method of effecting a controlled reduction in the cross-section of tubular electrical heaters, each formed by a heater element embedded in powdered insulating material within a tube, comprising the steps of sensing the length of tube at a stage of production of the heater when the length of the heater is less than or equal to a desired nominal length, controlling, in accordance with the length so sensed and in a stepless variable manner, apparatus to reduce the cross-section of the tube, so that upon operation of said apparatus a desired length of tube is obtained, and wherein said reduction in cross-section is initiated at a position spaced along the tube from the front end of the tube and is terminated at a position spaced along the tube from the rear end of the tube.

5. A method as claimed in claim 3, wherein movement of a measuring slide causes a stop to move in a given transmission ratio, and that this stop delays the adjustment of said apparatus to reduce the cross-section.

6. Apparatus for effecting a controlled reduction in the cross-section of tubular electric heaters formed by a heater element embedded in a powdered insulating material within a tube, comprising
conveying means for the tube,
apparatus to act upon the tube to reduce the cross-section thereof,
a first measuring sensor movable transversely to the direction in which the tube is moved by the conveying means, and
a second measuring sensor movable in the same direction as the direction in which the tube is moved by the conveying means;
said apparatus to act upon the tube to reduce the cross-section of the tube being provided downstream of a measuring section extending between said first and said second sensors in the direction in which the tube is conveyed, and said apparatus being coupled to said sensor in such a way that the extent of its reducing action is set when the front end of the tube is in contact with said first sensor and the rear end of the tube is in contact with said second sensor.

7. Apparatus as claimed in claim 6, wherein said first measuring sensor is in the form of a stop, said second measuring sensor is in the form of a stop arranged on a slide and said apparatus is in the form of a pair of rollers, said second stop and said apparatus being coupled together in a manner such that the distance between said rollers lessens as said slide moves in the direction in which the tube is being conveyed.

8. Apparatus as claimed in claim 7, wherein the movement of said slide is coupled by servo means with said pair of rollers.

9. Apparatus as claimed in claim 8, further comprising an additional stop movable together with and in the same direction as said second stop, the additional stop being provided as a limit for the closing of said pair of rollers.

10. Apparatus as claimed in claim 9, further comprising a pressure cylinder and a transmission rod operable to change the distance between said rollers, said additional stop being coupled to said pressure cylinder in such manner as to limit the movement caused by said pressure cylinder.

11. Apparatus as claimed in claim 7, wherein said stops are so arranged that adjustment of said rollers to the required spacing found to be required is delayed until the front end of the tube has been conveyed a determined distance through said rollers and said rollers are lifted off the tube when the tube has been guided through them up to a position on the tube spaced from the rear end of the tube.

12. Apparatus as claimed in claim 11, further comprising an abutment contact provided downstream of said rollers in the direction of movement of the tube, and a further abutment contact provided upstream of said rollers in the direction of movement, said abutment contact being operated by the front end of the tube to adjust said rollers and said further abutment contact being operated by the rear end of the tube to open said rollers.

13. Apparatus as claimed in claim 12, wherein said abutment contact and said further abutment contact control the movement caused by said pressure cylinder.

* * * * *

UNITED STATES PATENT OFFICE
CERTIFICATE OF CORRECTION

Patent No. 3,807,207　　　　　　　　　Dated April 30, 1974

Inventor(s) STANISLAUS OBDRZALEK

It is certified that error appears in the above-identified patent and that said Letters Patent are hereby corrected as shown below:

Title Page insert: "Assigned to BLECKMANN & CO., Salzburg-Maxglan, Austria".

Signed and sealed this 10th day of December 1974.

(SEAL)
Attest:

McCOY M. GIBSON JR.　　　　　　　C. MARSHALL DANN
Attesting Officer　　　　　　　　Commissioner of Patents